United States Patent
Tsunoi et al.

(10) Patent No.: US 11,440,987 B2
(45) Date of Patent: Sep. 13, 2022

(54) TETRA-BLOCK COPOLYMER, AND POLYMER COMPOSITION, AND HOT-MELT STICKY ADHESIVE COMPOSITION USING THESE

(71) Applicant: ZEON CORPORATION, Tokyo (JP)

(72) Inventors: Leo Tsunoi, Tokyo (JP); Ryoji Oda, Tokyo (JP); Sadaharu Hashimoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 137 days.

(21) Appl. No.: 16/971,683

(22) PCT Filed: Feb. 20, 2019

(86) PCT No.: PCT/JP2019/006276
§ 371 (c)(1),
(2) Date: Aug. 21, 2020

(87) PCT Pub. No.: WO2019/167745
PCT Pub. Date: Sep. 6, 2019

(65) Prior Publication Data
US 2020/0407481 A1     Dec. 31, 2020

(30) Foreign Application Priority Data
Feb. 27, 2018  (JP) .............................. JP2018-033166

(51) Int. Cl.
| | | |
|---|---|---|
| C08F 297/04 | (2006.01) | |
| C09J 7/35 | (2018.01) | |
| C09J 7/21 | (2018.01) | |
| C08L 53/02 | (2006.01) | |
| C09J 153/02 | (2006.01) | |

(52) U.S. Cl.
CPC ............ C08F 297/04 (2013.01); C08L 53/02 (2013.01); C09J 7/21 (2018.01); C09J 7/35 (2018.01); C09J 153/02 (2013.01); C09J 2453/00 (2013.01)

(58) Field of Classification Search
CPC ........................... C09J 153/02; C09J 153/025
See application file for complete search history.

(56) References Cited

U.S. PATENT DOCUMENTS

| | | | |
|---|---|---|---|
| 2003/0187137 A1* | 10/2003 | Handlin, Jr. .......... | C08L 53/025 525/98 |
| 2004/0197588 A1* | 10/2004 | Thomas .............. | B32B 38/1875 156/244.11 |
| 2006/0151901 A1 | 7/2006 | Leffelaar et al. | |
| 2019/0382620 A1* | 12/2019 | Cheung ...................... | C09J 5/06 |

FOREIGN PATENT DOCUMENTS

WO        2004056935 A1    7/2004

OTHER PUBLICATIONS

Apr. 2, 2019, International Search Report issued in the International Patent Application No. PCT/JP2019/006276.

* cited by examiner

*Primary Examiner* — Jeffrey C Mullis
(74) *Attorney, Agent, or Firm* — Kenja IP Law PC

(57) ABSTRACT

A tetrablock copolymer having an aromatic vinyl block (A1), a conjugated diene block (B1), an aromatic vinyl block (A2), and a conjugated diene block (B2) is provided, wherein Mw(A2)/Mw(A1) is 1.2 to 5, Mw(A2) is 12,000 or more, Mw(B1)>Mw(B2), Mw(Total) is 50,000 to 400,000 where the weight average molecular weight of the aromatic vinyl block (A1) is defined as Mw(A1), the weight average molecular weight of the conjugated diene block (B1) is defined as Mw(B1), the weight average molecular weight of the aromatic vinyl block (A2) is defined as Mw(A2), the weight average molecular weight of the conjugated diene block (B2) is defined as Mw(B2), and the weight average molecular weight of the tetrablock copolymer as a whole is defined as Mw(Total), and the content of aromatic vinyl monomer units is 10 to 30% by weight.

8 Claims, No Drawings

TETRA-BLOCK COPOLYMER, AND POLYMER COMPOSITION, AND HOT-MELT STICKY ADHESIVE COMPOSITION USING THESE

TECHNICAL FIELD

The present invention relates to a tetrablock copolymer, a polymer composition, and a hot-melt adhesive composition including these, and more specifically relates to a tetrablock copolymer and a polymer composition which can provide a hot-melt adhesive composition having high holding power not only to smooth surface paper but also rough surface paper, and a hot-melt adhesive composition including these.

BACKGROUND ART

Hot-melt adhesives are adhesives which can efficiently bond a variety of products because of their short solidification time, and have high safety to human bodies because they are solvent-free. For these reasons, the hot-melt adhesives have been used in a variety of fields. One of representative applications of the hot-melt adhesive is use as an adhesive for packaging adhesive tapes.

For example, Patent Document 1 discloses a linear tetrablock copolymer obtainable by full sequential polymerization of predominantly styrene and of predominantly isoprene, the linear tetrablock copolymer having an apparent molecular weight in the range of 205,000 to 225,000, wherein the poly(styrene) block has an apparent molecular weight of 10,000 to 12,000, the intermediate S—I diblock copolymer has an apparent molecular weight in the range of 130,000 to 185,000, the intermediate S—I—S triblock copolymer has an apparent molecular weight in the range of 145,000 to 195,000, and the poly(styrene) content is in the range of 14 to 16 wt %. Patent Document 1 discloses a packaging tape adhesive composition for cardboard box sealing tapes comprising the linear tetrablock copolymer, wherein 50 to 150 parts by weight of a tackifying resin, 0 to 50 parts by weight of a naphthenic oil or paraffinic oil, and 0.1 to 10 parts by weight of an antioxidant and/or other auxiliaries are contained relative to 100 parts by weight of the linear tetrablock copolymer.

On the other hand, environmental demands for cardboard boxes such as corrugated cardboards, which are sealing targets in Patent Document 1, have promoted use of recycled paper, and thus high content of recycled paper has been desired. However, cardboard boxes containing a relatively large amount of recycled paper usually have rough surfaces. For this reason, if a relatively large amount of recycled paper is contained in cardboard boxes such as corrugated cardboards, the cardboard boxes such as corrugated cardboards are made of rough surface paper.

In such circumstances, the packaging tape adhesive composition disclosed in Patent Document 1 has relatively high holding power to cardboard boxes made of smooth surface paper not containing recycled paper while having low holding power to cardboard boxes made of the rough surface paper containing a relatively large amount of recycled paper. Thus, a material which can also have high holding power to such rough surface paper has been desired.

RELATED ART

Patent Document

Patent Document 1: International Publication No. WO2004/056935

SUMMARY OF THE INVENTION

Problem to be Solved by the Invention

The present invention has been made in consideration of such circumstances. An object of the present invention is to provide a tetrablock copolymer and a polymer composition which can provide a hot-melt adhesive composition having high holding power not only to smooth surface paper but also to rough surface paper, and a hot-melt adhesive composition including these.

Means for Solving Problems

The present inventors, who have conducted extensive research to solve the above object, have found that the above object can be achieved by providing a tetrablock copolymer having an aromatic vinyl block (A1), a conjugated diene block (B1), an aromatic vinyl block (A2), and a conjugated diene block (B2) in this order, wherein the weight average molecular weights of the polymer blocks, the weight average molecular weight of the tetrablock copolymer, and the content of aromatic vinyl monomer units in the entire copolymer are controlled within specific ranges, and have completed the present invention.

In other words, the present invention provides a tetrablock copolymer having an aromatic vinyl block (A1), a conjugated diene block (B1), an aromatic vinyl block (A2), and a conjugated diene block (B2) in this order, wherein $Mw(A2)/Mw(A1)$ is 1.2 to 5, $Mw(A2)$ is 12,000 or more, $Mw(B1)>Mw(B2)$, and $Mw(Total)$ is 50,000 to 400,000, where the weight average molecular weight of the aromatic vinyl block (A1) is defined as $Mw(A1)$, the weight average molecular weight of the conjugated diene block (B1) is defined as $Mw(B1)$, the weight average molecular weight of the aromatic vinyl block (A2) is defined as $Mw(A2)$, the weight average molecular weight of the conjugated diene block (B2) is defined as $Mw(B2)$, and the weight average molecular weight of the tetrablock copolymer as a whole is defined as $Mw(Total)$, and the content of aromatic vinyl monomer units is 10 to 30% by weight.

The present invention provides a polymer composition comprising 50% by weight or more of the tetrablock copolymer according to the present invention.

The polymer composition according to the present invention preferably comprises 50% by weight or less of a triblock copolymer having an aromatic vinyl block (A1), a conjugated diene block (B1), and an aromatic vinyl block (A2) in this order.

The present invention also provides a hot-melt adhesive composition comprising the tetrablock copolymer according to the present invention or the polymer composition according to the present invention, and a tackifying resin.

In the hot-melt adhesive composition according to the present invention, the content of the tackifying resin is preferably 10 to 500 parts by weight relative to 100 parts by weight of the tetrablock copolymer.

Preferably, the hot-melt adhesive composition according to the present invention further contains 1 to 500 parts by weight of a softening agent relative to 100 parts by weight of the tetrablock copolymer.

Furthermore, the present invention provides an adhesive tape, particularly a packaging tape for adherents containing recycled paper, comprising the hot-melt adhesive composition according to the present invention.

Effects of Invention

The present invention can provide the tetrablock copolymer and the polymer composition which can provide a hot-melt adhesive composition having high holding power not only to smooth surface paper but also to rough surface paper, and the hot-melt adhesive composition including these.

DESCRIPTION OF EMBODIMENTS

<Tetrablock Copolymer>

The tetrablock copolymer according to the present invention comprises an aromatic vinyl block (A1), a conjugated diene block (B1), an aromatic vinyl block (A2), and a conjugated diene block (B2) in this order, wherein Mw(A2)/Mw(A1) is 1.2 to 5, Mw(A2) is 12,000 or more, Mw(B1)>Mw(B2), and Mw(Total) is 50,000 to 400,000, where the weight average molecular weight of the aromatic vinyl block (A1) is defined as Mw(A1), the weight average molecular weight of the conjugated diene block (B1) is defined as Mw(B1), the weight average molecular weight of the aromatic vinyl block (A2) is defined as Mw(A2), the weight average molecular weight of the conjugated diene block (B2) is defined as Mw(B2), and the weight average molecular weight of the tetrablock copolymer as a whole is defined as Mw(Total), and the content of aromatic vinyl monomer units is 10 to 30% by weight.

The aromatic vinyl block (A1) constituting the tetrablock copolymer according to the present invention is a polymer block including, as the major repeating unit, aromatic vinyl monomer units prepared through polymerization of an aromatic vinyl monomer.

The aromatic vinyl monomer used to form the aromatic vinyl monomer units for the aromatic vinyl block (A1) can be any aromatic vinyl compound. Examples of usable aromatic vinyl monomers include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, and the like. Among these, use of styrene is preferred. These aromatic vinyl monomers can be used alone or in combination.

The aromatic vinyl block (A1) may contain other monomer units as long as the aromatic vinyl monomer units are the major repeating unit. Examples of monomers which form monomer units other than the aromatic vinyl monomer units contained in the aromatic vinyl block (A1) include conjugated diene monomers such as 1,3-butadiene and isoprene (2-methyl-1,3-butadiene), α,β-unsaturated nitrile monomers, unsaturated carboxylic acid monomers or acid anhydride monomers, unsaturated carboxylic acid ester monomers, non-conjugated diene monomers, and the like. The content of the monomer units other than the aromatic vinyl monomer units in the aromatic vinyl block (A1) is preferably 20% by weight or less, more preferably 10% by weight or less, particularly preferably substantially 0% by weight. In other words, the aromatic vinyl block (A1) is preferably composed of substantially only units of one or two or more aromatic vinyl monomers, and particularly preferably composed of only styrene units.

The conjugated diene block (B1) constituting the tetrablock copolymer according to the present invention is a polymer block including, as the major repeating unit, conjugated diene monomer units prepared through polymerization of a conjugated diene monomer.

The conjugated diene monomer used to form the conjugated diene monomer units for the conjugated diene block (B1) can be any conjugated diene compound. Examples thereof include 1,3-butadiene, isoprene, 2,3-dimethyl-1,3-butadiene, 2-chloro-1,3-butadiene, 1,3-pentadiene, 1,3-hexadiene, myrcene, farnesene, and the like. Among these, preferred is use of 1,3-butadiene and/or isoprene, and particularly preferred is use of isoprene. These conjugated diene monomers can be used alone or in combination. Furthermore, unsaturated bonds of the conjugated diene block (B1) may be partially subjected to a hydrogenation reaction.

The conjugated diene block (B1) may contain other monomer units as long as the conjugated diene monomer units are the major repeating unit. Examples of monomers which form monomer units other than the conjugated diene monomer units contained in the conjugated diene block (B1) include aromatic vinyl monomers such as styrene and α-methylstyrene, α,β-unsaturated nitrile monomers, unsaturated carboxylic acid monomers or acid anhydride monomers, unsaturated carboxylic acid ester monomers, non-conjugated diene monomers, and the like. The content of the monomer units other than the conjugated diene monomer units in the conjugated diene block (B1) is preferably 20% by weight or less, more preferably 10% by weight or less, particularly preferably substantially 0% by weight. In other words, the conjugated diene block (B1) is preferably composed of substantially only units of one or two or more conjugated diene monomers, and particularly preferably composed of only isoprene units.

Although not particularly limited, the vinyl bond content in the conjugated diene block (B1) (total proportion of 1,2-vinyl bond units and 3,4-vinyl bond units in the total conjugated diene monomer units included in the conjugated diene block (B1)) is preferably 1 to 20 mol %, more preferably 2 to 15 mol %, particularly preferably 3 to 10 mol %.

The aromatic vinyl block (A2) constituting the tetrablock copolymer according to the present invention is a polymer block including, as the major repeating unit, aromatic vinyl monomer units prepared through polymerization of an aromatic vinyl monomer.

The aromatic vinyl monomer used to form the aromatic vinyl monomer units for the aromatic vinyl block (A2) can be any aromatic vinyl compound. Examples thereof include the same aromatic vinyl compounds as those listed for the aromatic vinyl block (A1) above.

The aromatic vinyl block (A2) may contain other monomer units as long as the aromatic vinyl monomer units are the major repeating unit. Examples of monomers which form the monomer units other than the aromatic vinyl monomer units include the same monomers as those listed for the aromatic vinyl block (A1). The content may also be the same as above. The aromatic vinyl block (A2) is preferably composed of substantially only units of one or two or more aromatic vinyl monomers, and particularly preferably composed of only styrene units.

The conjugated diene block (B2) constituting the tetrablock copolymer according to the present invention is a polymer block including, as the major repeating unit, conjugated diene monomer units prepared through polymerization of a conjugated diene monomer.

The aromatic vinyl monomer used to foam the conjugated diene monomer units for the conjugated diene block (B2) can be any conjugated diene compound. Examples thereof include the same conjugated diene compounds as those listed for the conjugated diene block (B1) above.

The conjugated diene block (B2) may contain other monomer units as long as the conjugated diene monomer units are the major repeating unit. Examples of monomers which form the monomer units other than the conjugated diene monomer units include the same monomers as those listed for the conjugated diene block (B1) above. The content of such units and the vinyl bond content may also be the same as above. The conjugated diene block (B2) is also preferably composed of substantially only units of one or two or more conjugated diene monomers, and particularly preferably composed of only isoprene units.

In the tetrablock copolymer according to the present invention, where for the polymer blocks constituting the tetrablock copolymer according to the present invention, the weight average molecular weight of the aromatic vinyl block (A1) is defined as Mw(A1), the weight average molecular weight of the conjugated diene block (B1) is defined as Mw(B1), the weight average molecular weight of the aromatic vinyl block (A2) is defined as Mw(A2), the weight average molecular weight of the conjugated diene block (B2) is defined as Mw(B2), and the weight average molecular weight of the tetrablock copolymer as a whole is defined as Mw(Total), the weight average molecular weights of these polymer blocks and the weight average molecular weight of the tetrablock copolymer are controlled to fall within the following ranges.

In other words, Mw(A2)/Mw(A1) is within the range of 1.2 to 5, Mw(A2) is 12,000 or more, the relation represented by Mw(B1)>Mw(B2) is satisfied, and Mw(Total) is within the range of 50,000 to 400,000. According to the present invention, by controlling the weight average molecular weights of these polymer blocks and the weight average molecular weight of the tetrablock copolymer within these ranges, mixing thereof with a tackifying resin and the like can result in a hot-melt adhesive composition having high holding power not only to smooth surface paper but also to rough surface paper.

The tetrablock copolymer according to the present invention has a ratio Mw(A2)/Mw(A1) in the range of 1.2 to 5, preferably 1.2 to 4, more preferably 1.2 to 3. An excessively small ratio Mw(A2)/Mw(A1) results in a hot-melt adhesive composition having low holding power to smooth surface paper and rough surface paper while an excessively high ratio Mw(A2)/Mw(A1) also results in a hot-melt adhesive composition having low holding power to smooth surface paper and rough surface paper.

The tetrablock copolymer according to the present invention has an Mw(A2) of 12,000 or more, preferably 13,000 or more, more preferably 14,000 or more. An excessively small Mw(A2) results in a hot-melt adhesive composition having low holding power to smooth surface paper and rough surface paper. The upper limit of Mw(A2), although not particularly limited, is 150,000 or less, for example.

The tetrablock copolymer according to the present invention satisfies the relation represented by Mw(B1)>Mw(B2). The value of Mw(B1)/Mw(B2) is within the range of preferably 1.01 to 5, more preferably 1.1 to 4. If the relation represented by Mw(B1)>Mw(B2) is not satisfied, the resulting hot-melt adhesive composition has low holding power to smooth surface paper and rough surface paper.

Furthermore, the tetrablock copolymer according to the present invention has an Mw(Total) in the range of 50,000 to 400,000, preferably 75,000 to 350,000, more preferably 100,000 to 300,000. An excessively small Mw(Total) results in a hot-melt adhesive composition having low holding power to smooth surface paper and rough surface paper while an excessively large Mw(Total) results in a hot-melt adhesive composition having high viscosity, reducing heat melting processability at an industrial scale.

In the tetrablock copolymer according to the present invention, Mw(A1), although not particularly limited, is preferably 5,000 to 50,000, more preferably 6,000 to 40,000, still more preferably 7,000 to 30,000 to provide a hot-melt adhesive composition having further enhanced holding power to smooth surface paper and rough surface paper.

Moreover, in the tetrablock copolymer according to the present invention, Mw(B1), although not particularly limited, is preferably 50,000 to 250,000, more preferably 60,000 to 220,000, still more preferably 70,000 to 200,000 to provide a hot-melt adhesive composition having further enhanced holding power to smooth surface paper and rough surface paper.

Furthermore, in the tetrablock copolymer according to the present invention, Mw(B2), although not particularly limited, is preferably 20,000 to 200,000, more preferably 30,000 to 150,000, still more preferably 40,000 to 120,000 to provide a hot-melt adhesive composition having further enhanced holding power to smooth surface paper and rough surface paper.

In the present invention, the weight average molecular weights of the polymer blocks and the weight average molecular weight of the tetrablock copolymer are determined as values against polystyrene standards in measurement by high performance liquid chromatography.

The weight average molecular weights of the polymer blocks and the weight average molecular weight of the tetrablock copolymer can be controlled by adjusting the amounts of the monomers for forming the respective polymer blocks and the amounts of the polymerization initiators used to prepare the tetrablock copolymer according to the present invention through the polymerization reaction.

The content of aromatic vinyl monomer units in 100% by weight of the total monomer units constituting the tetrablock copolymer according to the present invention, i.e., the content of aromatic vinyl monomer units in the entire tetrablock copolymer is 10 to 30% by weight, preferably 11 to 25% by weight, more preferably 12 to 20% by weight. An excessively small or large content of aromatic vinyl monomer units in the entire tetrablock copolymer results in a hot-melt adhesive composition having low holding power to smooth surface paper and rough surface paper. The content of aromatic vinyl monomer units in the entire tetrablock copolymer can be controlled by adjusting the proportions of the polymer blocks in the entire tetrablock copolymer and the contents of aromatic vinyl monomer units in the aromatic vinyl block (A1) and the aromatic vinyl block (A2) in the entire tetrablock copolymer. If all the polymer moieties constituting the tetrablock copolymer are composed of only aromatic vinyl monomer units and conjugated diene monomer units, according to the method described in Rubber Chem. Technol., 45, 1295 (1972), the tetrablock copolymer is subjected to ozone decomposition, followed by reduction with lithium aluminum hydride to decompose the moieties consisting of conjugated diene monomer units and extract only the moieties consisting of aromatic vinyl monomer units. Thus, the content of aromatic vinyl monomer units in the entire tetrablock copolymer can be readily measured.

The vinyl bond content in the entire tetrablock copolymer according to the present invention (total proportion of 1,2-vinyl bond units and 3,4-vinyl bond units in the total conjugated diene monomer units contained in the entire tetrablock copolymer) is preferably 1 to 20 mol %, more preferably 2 to 15 mol %, particularly more preferably 3 to 10 mol %, although not particularly limited thereto.

The tetrablock copolymer according to the present invention may have a variety of modifying groups. Examples of such modifying groups include, but not should be limited to, a variety of acid groups and basic groups.

The tetrablock copolymer according to the present invention can be produced by any method. Preferred is the following method. Specifically, such a suitable production method comprises:

a first polymerization step of polymerizing monomer(s) including an aromatic vinyl monomer as the major component in a solvent in the presence of a polymerization initiator to prepare a solution containing aromatic vinyl block chains;

a second polymerization step of adding monomer(s) including a conjugated diene monomer as the major component to the resulting solution containing aromatic vinyl block chains, and performing polymerization to prepare a solution containing diblock chains;

a third polymerization step of adding monomer(s) including an aromatic vinyl monomer as the major component to the resulting solution containing diblock chains, and performing polymerization to prepare a solution containing triblock chains;

a fourth polymerization step of adding monomer(s) including a conjugated diene monomer as the major component to the resulting solution containing triblock chains, and performing polymerization to prepare a solution containing tetrablock chains; and a recovery step of recovering the polymer component from the solution containing tetrablock chains.

In the production method above, first, monomer(s) including an aromatic vinyl monomer as the major component is/are polymerized in a solvent in the presence of a polymerization initiator (first polymerization step). The polymerization initiator to be used can be organic alkali metal compounds, organic alkaline earth metal compounds, organic lanthanoid rare earth metal compounds, and the like, which are known to usually have anionic polymerization activity to aromatic vinyl monomers and conjugated diene monomers. For the organic alkali metal compounds, particularly suitably used are organic lithium compounds having one or more lithium atoms in the molecule. Specific examples thereof include organic monolithium compounds such as ethyllithium, n-propyllithium, isopropyllithium, n-butyllithium, sec-butyllithium, t-butyllithium, hexyllithium, phenyllithium, stilbenelithium, dialkylaminolithium, diphenylaminolithium, and ditrimethylsilylaminolithium; organic dilithium compounds such as methylenedilithium, tetramethylenedilithium, hexamethylenedilithium, isoprenyldilithium, and 1,4-dilithio-ethylcyclohexane; organic trilithium compounds such as 1,3,5-trilithiobenzene; and the like. Among these, organic monolithium compounds are particularly suitably used.

Examples of the organic alkaline earth metal compounds used as the polymerization initiator include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, ethylbarium, and the like. Specific examples of other polymerization initiators include those which form a homogeneous system in an organic solvent to have living polymerizability, such as composite catalysts of lanthanoid rare earth metal compounds (including neodymium, samarium, gadolinium, and the like)/alkylaluminum/alkylaluminum halide/alkylaluminum hydride; metallocene catalysts containing titanium, vanadium, samarium, gadolinium, or the like. These polymerization initiators may be used alone or in combination as a mixture.

The amount of the polymerization initiator to be used may be determined according to the target molecular weight and is not particularly limited. The amount is preferably 0.01 to 20 mmol, more preferably 0.05 to 15 mmol, still more preferably 0.1 to 10 mmol per 100 g of the total monomers.

The solvent used in polymerization can be any solvent inactive to the polymerization initiator. For example, a linear hydrocarbon solvent, a cyclic hydrocarbon solvent, or a mixed solvent thereof is used. Examples of the linear hydrocarbon solvent include linear alkanes and alkenes having 4 to 6 carbon atoms such as n-butane, isobutane, 1-butene, isobutylene, trans-2-butene, cis-2-butene, 1-pentene, trans-2-pentene, cis-2-pentene, n-pentane, isopentane, neopentane, and n-hexane. Specific examples of the cyclic hydrocarbon solvent include aromatic compounds such as benzene, toluene, and xylene; alicyclic hydrocarbon compounds such as cyclopentane and cyclohexane. These solvents may be used alone or in combination as a mixture.

Although not particularly limited, the amount of the solvent used in polymerization is preferably set such that the content of the tetrablock copolymer in the finally obtained tetrablock copolymer solution falls within the range of preferably 5 to 60% by weight, more preferably 10 to 55% by weight, particularly 20 to 50% by weight.

A Lewis base compound may be added to a reactor used in polymerization to control the structures of the polymer blocks. Examples of the Lewis base compound include ethers such as tetrahydrofuran, diethyl ether, dioxane, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyloxide and potassium t-butyloxide; phosphines such as triphenylphosphine; and the like. These Lewis base compounds may be used alone or in combination, and are appropriately selected in the range not impairing the object of the present invention.

The Lewis base compound can be added to the polymerization reaction at any timing, which may be appropriately determined according to the structures of the block copolymers. For example, the Lewis base compounds may be preliminarily added before polymerization is started, or may be added after the polymer blocks are partially polymerized. Furthermore, the Lewis base compound may be preliminarily added before polymerization is started, and may be further added after the polymer blocks are partially polymerized.

The temperature for the polymerization reaction is preferably 10 to 150° C., more preferably 30 to 130° C., still more preferably 40 to 90° C. Although the time needed for polymerization varies according to the condition, the time is usually within 48 hours, preferably 0.5 to 10 hours. The polymerization pressure is not particularly limited, and polymerization may be performed at a pressure enough to maintain the monomer and the solvent in liquid phases at a polymerization temperature in the above range.

A solution containing aromatic vinyl block chains can be prepared by polymerizing monomer(s) including an aromatic vinyl monomer as the major component in the presence of the polymerization initiator under the condition described above. The aromatic vinyl block chains produced through polymerization usually have active terminals. The resulting aromatic vinyl block chains will form the aromatic vinyl block (A1). For this reason, the amount of the monomer(s) used in the first polymerization step may be determined according to the weight average molecular weight Mw(A1) of the aromatic vinyl block (A1).

In the next step, monomer(s) including a conjugated diene monomer as the major component is/are added to the solution containing aromatic vinyl block chains prepared in the first polymerization step to perform polymerization (second polymerization step). Thereby, a solution containing diblock chains can be prepared. The diblock chains produced through polymerization usually have active terminals. In the diblock chains produced through the second polymerization step, the polymer chain produced through the first polymerization step which will form the aromatic vinyl block (A1) is bonded to the polymer chain which will form the conjugated diene block (B1). For this reason, the amount of the monomer(s) used in the second polymerization step may be determined according to the weight average molecular weight Mw(B1) of the conjugated diene block (B1). The temperature for the polymerization reaction, the polymerization time, and the polymerization pressure may be controlled within the same ranges as those in the first polymerization step.

In the next step, monomer(s) including an aromatic vinyl monomer as the major component is/are added to the solution containing diblock chains prepared in the second polymerization step to perform polymerization (third polymerization step). Thereby, a solution containing triblock chains can be prepared. The triblock chains produced through polymerization usually have active terminals. In the triblock chains produced through the third polymerization step, the polymer chain produced in the second polymerization step which will form the aromatic vinyl block (A1) and the conjugated diene block (B1) is further bonded to the polymer chain which will form the aromatic vinyl block (A2). For this reason, the amount of the monomer(s) used in the third polymerization step may be determined according to the weight average molecular weight Mw(A2) of the aromatic vinyl block (A2). The temperature for the polymerization reaction, the polymerization time, and the polymerization pressure may be controlled within the same ranges as those in the first polymerization step.

In the next step, monomer(s) including an aromatic vinyl monomer as the major component is/are added to the solution containing triblock chains prepared in the third polymerization step to perform polymerization (fourth polymerization step). Thereby, a solution containing tetrablock chains can be prepared. The tetrablock chains produced through polymerization usually have active terminals. In the tetrablock chains produced through the fourth polymerization step, the polymer chain produced through the third polymerization step which will foam the aromatic vinyl block (A1), the conjugated diene block (B1), and the aromatic vinyl block (A2) is further bonded to the polymer chain which will foam the conjugated diene block (B2). For this reason, the amount of the monomer(s) used in the fourth polymerization step may be determined according to the weight average molecular weight Mw(B2) of the conjugated diene block (B2). The temperature for the polymerization reaction, the polymerization time, and the polymerization pressure may be controlled within the same ranges as those in the first polymerization step.

In the next step, the polymer component is recovered from the solution containing tetrablock chains prepared in the fourth polymerization step (recovery step). The recovery may be performed according to a normal method, and any method can be used without limitation. For example, the recovery can be performed as follows: After the reaction is completed, an optional polymerization terminator such as water, methanol, ethanol, propanol, hydrochloric acid, or citric acid and optional additives such as an antioxidant are added, and the solution is subjected to a known method such as direct drying or steam stripping. If the polymer component is recovered as a slurry by steam stripping or the like, the slurry may be dehydrated into crumbs having a water content less than or equal to a predetermined value using any dehydrating machine such as an extruder squeezer, and the crumbs may be further dried using any dryer such as a band dryer or an expansion extrusion dryer.

Thus, the tetrablock copolymer according to the present invention can be produced.

<Polymer Composition>

The polymer composition according to the present invention comprises 50% by weight or more of the tetrablock copolymer according to the present invention. The proportion of the tetrablock copolymer contained in the polymer composition according to the present invention is preferably 60% by weight or more, more preferably 70% by weight or more.

It is sufficient that the polymer composition according to the present invention comprises 50% by weight or more of the tetrablock copolymer according to the present invention. Although the tetrablock copolymer according to the present invention can contain any other components, such other components are preferably polymers other than the tetrablock copolymer according to the present invention, and in particular, more preferably a triblock copolymer having an aromatic vinyl block (A1), a conjugated diene block (B1), and an aromatic vinyl block (A2) in this order. The content of such a triblock copolymer is preferably 50% by weight or less, more preferably 40% by weight or less, still more preferably 30% by weight or less. The triblock copolymer has a linear structure, and thus can reduce the weight average molecular weight of the entire polymer composition. Accordingly, the polymer composition containing the triblock copolymer can have a reduced viscosity compared to a polymer composition not containing the triblock copolymer if these polymer compositions have the same weight average molecular weight. For this reason, the polymer composition containing the triblock copolymer is preferred from the viewpoint of processability. The triblock copolymer contained in the range above does not significantly reduce the holding power not only to smooth surface paper but also to rough surface paper.

If the polymer composition according to the present invention comprises the tetrablock copolymer according to the present invention and a triblock copolymer having an aromatic vinyl block (A1), a conjugated diene block (B1), and an aromatic vinyl block (A2) in this order (hereinafter, simply referred to as "triblock copolymer"), the polymer composition containing the tetrablock copolymer according to the present invention and the triblock copolymer may be prepared as follows: For example, in the method of producing the tetrablock copolymer according to the present invention described above, the active terminals of the triblock chains produced in the third polymerization step may be partially deactivated after the completion of the third polymerization step by a method of adding a predetermined amount of polymerization terminator or by a method of performing stabilization to keep the resulting solution at a predetermined temperature for a predetermined time.

If the stabilization is performed after the completion of the third polymerization step, the stabilization temperature and pressure may be controlled within the same ranges as the polymerization temperature and the polymerization pressure in the third polymerization step, respectively. Although the time needed for the stabilization varies according to the condition, it is usually within 48 hours, preferably within 0.1 to 10 hours since the polymerization conversion ratio of the monomer(s) added in the third polymerization step has reached 100%. For example, the stabilization can be performed by further treating the resulting solution for 0.1 to 10 hours at the same temperature and pressure as those in the third polymerization step after the polymerization conversion ratio of the monomer(s) added in the third polymerization step reaches 100%.

Alternatively, the polymer composition containing the tetrablock copolymer according to the present invention and the triblock copolymer may be prepared as follows: The polymerization reaction of part of the triblock chains produced in the third polymerization step may be inhibited in the fourth polymerization step by adjusting the polymerization condition.

<Hot-Melt Adhesive Composition>

The hot-melt adhesive composition according to the present invention comprises the tetrablock copolymer or the polymer composition according to the present invention and a tackifying resin. The tackifying resin used in the present invention can be a conventionally known tackifying resin.

Examples of the tackifying resin include rosin; modified rosins such as hydrogenated rosins, disproportionated rosins, and dimerized rosins; esterified products of polyhydric alcohols such as glycol, glycerol, and pentaerythritol with rosin or modified rosins; terpene resins such as α-pinene, β-pinene, and dipentene (limonene) resins; aliphatic, aromatic, and alicyclic hydrocarbon resins and aliphatic-aromatic copolymerized hydrocarbon resins or hydrides thereof; phenol resins; coumarone-indene resins; and the like. Among these, suitably used are aliphatic hydrocarbon resins or aliphatic-aromatic copolymerized hydrocarbon resins which have high miscibility with the tetrablock copolymer and the polymer composition according to the present invention. These tackifying resins may be used or in combination.

The content of the tackifying resin in the hot-melt adhesive composition according to the present invention is preferably 10 to 500 parts by weight, more preferably 50 to 350 parts by weight, still more preferably 70 to 250 parts by weight relative to 100 parts by weight of the tetrablock copolymer.

Preferably, the hot-melt adhesive composition according to the present invention further contains a softening agent. The softening agent may be any organic compound which is liquid at room temperature (23° C.) and has miscibility with the tetrablock copolymer and the polymer composition when they are melted. Whether the softening agent has miscibility with the tetrablock copolymer or the polymer composition can be verified by the following method. Specifically, the tetrablock copolymer or the polymer composition is melt mixed with the softening agent in the same weight as that of the tetrablock copolymer or the polymer composition. The mixture is left to stand under room temperature (23° C.) until it is cooled to room temperature (23° C.). The resulting mixture is visually observed, and no turbidity in the observation leads to a determination that the softening agent has miscibility with the tetrablock copolymer or the polymer composition. Any type of softening agent can be used as long as it has miscibility with the tetrablock copolymer or the polymer composition. Specifically, those usually added to hot-melt adhesive compositions, for example, aromatic, paraffinic, or naphthenic process oils; and liquid polymers such as polybutene and polyisobutylene can be used. Among these, particularly suitable are paraffinic or naphthenic process oils. These softening agents may be used alone or in combination.

Although not particularly limited, the content of the softening agent in the hot-melt adhesive composition according to the present invention is preferably 1 to 500 parts by weight, more preferably 1 to 300 parts by weight, still more preferably 5 to 200 parts by weight, particularly preferably 10 to 100 parts by weight relative to 100 parts by weight of the tetrablock copolymer.

The hot-melt adhesive composition according to the present invention may further contain a wax. The wax is an organic compound which is an oily or fatty solid at room temperature (23° C.) and has immiscibility with the tetrablock copolymer or the polymer composition when melted. Any type of wax can be used without limitation. For example, a wax having immiscibility with the tetrablock copolymer or polymer composition to be used can be selected from polyethylene waxes, ethylene-vinyl acetate copolymer waxes, oxidized polyethylene waxes, paraffin waxes, microcrystalline waxes, Fischer-Tropsh waxes, oxidized Fischer-Tropsh waxes, hydrogenated cater oil waxes, polypropylene waxes, by-product polyethylene waxes, hydroxylated stearamide waxes, and the like. Here, whether the wax is immiscible with the tetrablock copolymer or the polymer composition can be verified by the method described below. Specifically, the tetrablock copolymer or the polymer composition is melt mixed with the wax in the same weight as that of the tetrablock copolymer or the polymer composition. The resulting mixture is left to stand under room temperature (23° C.) until it is cooled to room temperature (23° C.). The mixture is visually observed, and turbidity, if found in the observation, leads to a determination that the wax has immiscibility with the tetrablock copolymer or the polymer composition. These waxes may be used alone or in combination.

The hot-melt adhesive composition according to the present invention may contain another polymer as a component other than the components described above. Examples of such another polymer include, but should not be limited to, conjugated diene homopolymers such as polybutadiene and polyisoprene; aromatic vinyl-conjugated diene random copolymers such as (styrene-butadiene) random copolymers and (styrene-isoprene) random copolymers; aromatic vinyl homopolymers such as polystyrene; and polymers having elasticity at room temperature (23° C.), such as isobutylene polymers, acrylic polymers, ester polymers, ether polymers, urethane polymers, and polyvinyl chloride. These polymers can be used alone or in combination. Although not particularly limited, the content of the another polymer in the hot-melt adhesive composition according to the present invention is preferably 20 parts by weight or less, more preferably 10 parts by weight or less relative to 100 parts by weight of the tetrablock copolymer.

The hot-melt adhesive composition according to the present invention may contain an antioxidant as needed. Examples of the antioxidant include, but should not be limited to, hindered phenol compounds such as pentaerythritol tetrakis[3-(3,5-di-t-butyl-4-hydroxyphenyl)propionate], octadecyl 3-(3,5-di-t-butyl-4-hydroxyphenyl)propionate, 2,6-di-t-butyl-p-cresol, and di-t-butyl-4- methylphenol; thiodicarboxylate esters such as dilauryl thiopropionate; phosphorous acid salts such as tris(nonylphenyl)phosphite; and the like. Although not particularly limited, the content of the antioxidant is preferably 10 parts by weight or less, more preferably 0.5 to 5 parts by weight relative to 100 parts by weight of the tetrablock copolymer. These antioxidants may be used alone or in combination.

The hot-melt adhesive composition according to the present invention may further contain other compounding agents such as a heat stabilizer, a foaming agent, an ultraviolet absorbing agent, a photopolymerization initiator, and a filler. The hot-melt adhesive composition according to the present invention is preferably a solvent-free composition not containing any solvent.

In the production of the hot-melt adhesive composition according to the present invention, the components can be mixed by any method. Examples thereof include a method of dissolving the components in a solvent, homogeneously mixing these, and removing the solvent by heating or the like; and a method of melt mixing the components with a kneader, an extruder, a stirrer such as a vertical or side arm impeller, or the like. Among these method, melt mixing is suitable from the viewpoint of more efficient mixing. The melt mixing temperature is usually in the range of 100 to 200° C., although not particularly limited.

The hot-melt adhesive composition according to the present invention comprises the tetrablock copolymer according to the present invention above, and therefore has high holding power not only to smooth surface paper but also to rough surface paper. For this reason, utilizing such properties, the hot-melt adhesive composition according to the present invention can be suitably used as an adhesive for adhesive tapes, especially, as a packaging tape adhesive for adherents containing recycled paper (for example, cardboard boxes containing recycled paper, such as corrugated cardboards). In particular, adherents containing recycled paper, especially, adherents containing a relatively large amount (such as 50% by weight or more) of recycled paper have roughened surfaces, which results in difficulties in adhesion compared to ordinary smooth surface paper. The hot-melt adhesive composition according to the present invention can effectively solve such a problem, and thus can be particularly suitably used in such applications.

EXAMPLES

Hereinafter, the present invention will be more specifically described by way of Examples and Comparative Examples, but the present invention will not be limited only to these Examples. To be noted, "parts" and "%" are weight-based unless otherwise specified.

A variety of measurements were performed according to the following methods.

[Weight Average Molecular Weight]

The weight average molecular weight was determined as a molecular weight against polystyrene standards by high performance liquid chromatography where tetrahydrofuran at a flow rate of 0.35 ml/min was used as a carrier. The measurement was performed using an apparatus available from Tosoh Corporation HLC8220, three columns (Shodex KF-404HQ available from Showa Denko K.K.) connected in series (column temperature: 40° C.), and a differential refractometer and an ultraviolet detector as detectors. The molecular weight was calibrated against 12 points of polystyrene standards (500 to 3,000,000) available from Polymer Laboratories Ltd.

The weight average molecular weight Mw(A1) of the aromatic vinyl block (A1), the weight average molecular weight Mw(B1) of the conjugated diene block (B1), the weight average molecular weight Mw(A2) of the aromatic vinyl block (A2), and the weight average molecular weight Mw(B2) of the conjugated diene block (B2) were determined as follows: Each of the polymer block chains was sampled in the course of the corresponding polymerization reaction, and was subjected to high performance liquid chromatography. Then, the difference between the weight average molecular weight Mw(A1-B1) of the polymer diblock A1-B1 and the Mw(A1) was determined as the Mw(B1). The difference between the weight average molecular weight Mw(A1-B1-A2) of the polymer triblock A1-B1-A2 and the weight average molecular weight Mw(A1-B1) was determined as the weight average molecular weight Mw(A2). The difference between the weight average molecular weight Mw(A1-B1-A2-B2) of the polymer tetrablock A1-B1-A2-B2 and the weight average molecular weight Mw(A1-B1-A2) was determined as the weight average molecular weight Mw(B2).

[Styrene Unit Content]

The styrene unit content was determined based on the ratio of the detected intensity by the differential refractometer and that by the ultraviolet detector in the measurement by high performance liquid chromatography. Copolymers having different styrene unit contents were preliminarily prepared. Using those copolymers, a calibration curve was created. The styrene unit content was determined using the resulting calibration curve.

[Holding Power of Hot-Melt Adhesive Composition]

An adhesive tape having a width of 10 mm was prepared as a sample for evaluation. Smooth surface paper (NIST SRM 1810A) and rough surface paper (available from Eco Kraft Wrapping Paper Roll, Paper Farm, recycled paper ratio: 100%) were used as adherents. According to PSTC-107 (holding power test method specified by Pressure Sensitive Tape Council of the United States), the holding power was evaluated according to the time (min) until the bonded portion measuring 10×25 mm peeled off under a load of 1000±5 g at a temperature of 40° C. A larger value indicates a higher holding power.

Example 1

(Preparation of Tetrablock Copolymer)

1.200 kg of Cyclohexane, 28 mmol of N,N,N',N'-tetramethylethylenediamine, and 0.019 kg of styrene were placed into a pressure-resistant reactor. Under stirring at 40° C., 1.82 mmol of n-butyllithium was added to perform polymerization for 0.5 hours while the system was being heated to 50° C. (first polymerization step). The polymerization conversion ratio of styrene was 100% by weight. Subsequently, while the temperature was being controlled to stay 50 to 60° C., 0.180 kg of isoprene was continuously added to the reactor over 0.5 hours. After the addition of isoprene was completed, polymerization was further performed for 0.5 hours (second polymerization step). The polymerization conversion ratio of isoprene was 100%. In the next step, while the temperature was being controlled to stay 50 to 60° C., 0.024 kg of styrene was continuously added to the reactor over 0.5 hours. After the addition of styrene was completed, polymerization was further performed for 0.5 hours (third polymerization step). The polymerization conversion ratio of styrene was 100%. Subsequently, while the temperature was being controlled to stay 50 to 60° C., stabilization was performed for 1 hour. Thereafter, 0.077 kg of isoprene was continuously added to the reactor over 1 hour. After the addition of isoprene was completed, polymerization was further pertained for 1 hour (fourth polymerization step). The polymerization conversion ratio of isoprene was 100%. Thereafter, 25 mmol of methanol was added as a polymerization terminator, and was sufficiently mixed to terminate the reaction. 0.2 Parts of 2,6-di-t-butyl-p-cresol as an antioxidant was added relative to 100 parts of the resulting reaction solution (containing 20 parts of the polymer component), followed by mixing. The resulting mixed solution in portions was added dropwise to hot water heated to 85 to 95° C. to volatilize the solvent, thereby yielding a precipitate. The precipitate was pulverized, and was hot air dried at 85° C. to prepare a polymer composition containing a tetrablock copolymer (proportion of the tetrablock copolymer: 82% by weight, proportion of the triblock copolymer: 18% by weight). The weight average molecular weights of the polymer blocks which constituted the resulting tetrablock copolymer, the ratios thereof, and the weight average molecular weight of the tetrablock copolymer are shown in Table 1.

(Hot-Melt Adhesive Composition)

100 Parts of the polymer composition containing a tetrablock copolymer prepared above was placed into a stirring blade type kneader, and 100 parts of a tackifying resin (trade name "Quintone R100", aliphatic hydrocarbon resin, available from ZEON Corporation), 20 parts of a naphthenic process oil (trade name "Diana Process Oil NS-90S", available from Idemitsu Kosan Co. Ltd.), and 1.5 parts of an antioxidant (trade name "Irganox 1076", octadecyl 3-(3,5-di-t-butyl-4-hydroxyphenyl)propionate, available from BASF SE) were added thereto. The inside of the system was purged with nitrogen gas, and the materials were kneaded at 160 to 180° C. for 1 hour to prepare a hot-melt adhesive composition. The resulting hot-melt adhesive composition was applied to prepare a sample for evaluation. Using this sample, the holding power was evaluated. The results are shown in Table 1.

Example 2

(Preparation of Tetrablock Copolymer)

A polymer composition containing a tetrablock copolymer (proportion of the tetrablock copolymer: 74% by weight, proportion of the triblock copolymer: 26% by weight) was prepared in the same manner as in Example 1 except that the amount of styrene used in the first polymerization step was changed to 0.018 kg, the amount of n-butyllithium used therein was changed to 1.88 mmol, the amount of isoprene used in the second polymerization step was changed to 0.176 kg, the amount of styrene used in the third polymerization step was changed to 0.030 kg, the stabilization time in the fourth polymerization step was changed to 2 hours, and the amount of isoprene used therein was changed to 0.076 kg. The weight average molecular weights of the polymer blocks which constituted the resulting tetrablock copolymer, the ratios thereof, and the weight average molecular weight of the tetrablock copolymer are shown in Table 1.

(Hot-Melt Adhesive Composition)

A hot-melt adhesive composition was prepared in the same manner as in Example 1 except that the polymer composition containing a tetrablock copolymer prepared above was used. The resulting hot-melt adhesive composition was applied to prepare a sample for evaluation. Using this sample, the holding power was evaluated. The results are shown in Table 1.

Example 3

(Preparation of Tetrablock Copolymer)

A tetrablock copolymer was prepared in the same manner as in Example 1 except that the amount of styrene used in the first polymerization step was changed to 0.015 kg, the amount of n-butyllithium used therein was changed to 2.14 mmol, the amount of isoprene used in the second polymerization step was changed to 0.219 kg, the amount of styrene in the third polymerization step was changed to 0.028 kg, the stabilization in the fourth polymerization step was skipped, and the amount of isoprene used therein was changed to 0.039 kg. The weight average molecular weights of the polymer blocks which constituted the resulting tetrablock copolymer, the ratios thereof, and the weight average molecular weight of the tetrablock copolymer are shown in Table 1.

(Hot-Melt Adhesive Composition)

A hot-melt adhesive composition was prepared in the same manner as in Example 1 except that the tetrablock copolymer prepared above was used. The resulting hot-melt adhesive composition was applied to prepare a sample for evaluation. Using this sample, the holding power was evaluated. The results are shown in Table 1.

Example 4

(Preparation of Tetrablock Copolymer)

A polymer composition containing a tetrablock copolymer (proportion of the tetrablock copolymer: 96% by weight, proportion of the triblock copolymer: 4% by weight) was prepared in the same manner as in Example 1 except that the amount of n-butyllithium used in the first polymerization step was changed to 2.14 mmol, the amount of isoprene used in the second polymerization step was changed to 0.154 kg, the amount of styrene used in the third polymerization step was changed to 0.029 kg, the amount of isoprene used in the fourth polymerization step was changed to 0.098 kg, and the stabilization time was changed to 0.5 hours. The weight average molecular weights of the polymer blocks which constituted the resulting tetrablock copolymer, the ratios thereof, and the weight average molecular weight of the tetrablock copolymer are shown in Table 1.

(Hot-Melt Adhesive Composition)

A hot-melt adhesive composition was prepared in the same manner as in Example 1 except that the polymer composition containing a tetrablock copolymer prepared above was used. The resulting hot-melt adhesive composition was applied to prepare a sample for evaluation. Using this sample, the holding power was evaluated. The results are shown in Table 1.

Comparative Example 1

(Preparation of Tetrablock Copolymer)

A tetrablock copolymer was prepared in the same manner as in Example 3 except that the amount of styrene used in the first polymerization step was changed to 0.021 kg, the amount of n-butyllithium used therein was changed to 2.14 mmol, the amount of isoprene used in the second polymerization step was changed to 0.090 kg, the amount of styrene used in the third polymerization step was changed to 0.021 kg, and the amount of isoprene used in the fourth polymerization step was changed to 0.167 kg. The weight average molecular weights of the polymer blocks which constituted the resulting tetrablock copolymer, the ratios thereof, and the weight average molecular weight of the tetrablock copolymer are shown in Table 1.

(Hot-Melt Adhesive Composition)

A hot-melt adhesive composition was prepared in the same manner as in Example 1 except that the tetrablock copolymer prepared above was used. The resulting hot-melt adhesive composition was applied to prepare a sample for evaluation. Using this sample, the holding power was evaluated. The results are shown in Table 1.

Comparative Example 2

(Preparation of Tetrablock Copolymer)

A tetrablock copolymer was prepared in the same manner as in Comparative Example 1 except that the amount of styrene used in the first polymerization step was changed to 0.021 kg, the amount of n-butyllithium used therein was changed to 2.07 mmol, the amount of isoprene used in the second polymerization step was changed to 0.167 kg, the amount of styrene used in the third polymerization step was changed to 0.021 kg, and the amount of isoprene used in the fourth polymerization step was changed to 0.090 kg. The weight average molecular weights of the polymer blocks which constituted the resulting tetrablock copolymer, the ratios thereof, and the weight average molecular weight of the tetrablock copolymer are shown in Table 1.

(Hot-Melt Adhesive Composition)

A hot-melt adhesive composition was prepared in the same manner as in Example 1 except that the tetrablock copolymer prepared above was used. The resulting hot-melt adhesive composition was applied to prepare a sample for evaluation. Using this sample, the holding power was evaluated. The results are shown in Table 1.

Comparative Example 3

(Preparation of Triblock Copolymer)

A triblock copolymer was prepared in the same manner as in Comparative Example 1 except that the amount of styrene used in the first polymerization step was changed to 0.021 kg, the amount of n-butyllithium used therein was changed to 2.00 mmol, the amount of isoprene used in the second polymerization step was changed to 0.257 kg, the amount of styrene used in the third polymerization step was changed to 0.021 kg, and the polymerization according to the fourth polymerization step was not performed. The weight average molecular weights of the polymer blocks which constituted the resulting triblock copolymer, the ratios thereof, and the weight average molecular weight of the tetrablock copolymer are shown in Table 1.

(Hot-Melt Adhesive Composition)

A hot-melt adhesive composition was prepared in the same manner as in Example 1 except that the triblock copolymer prepared above was used. The resulting hot-melt adhesive composition was applied to prepare a sample for evaluation. Using this sample, the holding power was evaluated. The results are shown in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Tetra block copolymer (polymer composition containing tetrablock copolymer) | | | | | | | |
| Weight average molecular weight Mw(A1) of aromatic vinyl block (A1) | 11,000 | 9,500 | 9,000 | 10,000 | 10,000 | 10,000 | 12,000 |
| Weight average molecular weight Mw(B1) of conjugated diene block (B1) | 175,000 | 149,000 | 200,000 | 110,000 | 70,000 | 140,000 | 200,000 |
| Weight average molecular weight Mw(A2) of aromatic vinyl block (A2) | 15,000 | 16,500 | 18,500 | 13,000 | 10,000 | 10,000 | 12,000 |
| Weight average molecular weight Mw(B2) of conjugated diene block (B2) | 110,000 | 62,000 | 40,000 | 70,000 | 130,000 | 70,000 | — |
| Weight average molecular weight Mw(Total) of tetrablock copolymer | 281,000 | 224,000 | 260,000 | 190,000 | 210,000 | 224,000 | 220,000 |
| Mw(A2)/Mw(A1) | 1.4 | 1.7 | 2.1 | 1.3 | 1.0 | 1.0 | 1.0 |
| Mw(B1)/Mw(B2) | 1.6 | 2.4 | 5.0 | 1.6 | 0.5 | 2.0 | — |
| Aromatic vinyl monomer unit content in tetrablock copolymer [wt %] | 14 | 17 | 14 | 16 | 16 | 15 | 14 |
| Tetrablock copolymer content in polymer composition [wt %] | 82 | 74 | 100 | 96 | 100 | 100 | 100 |
| Evaluations of hot-melt adhesive composition | | | | | | | |
| Holding power to smooth surface paper (time until bonded portion peels off) [min] | 2,500 | 2,200 | 3,000 | 2,300 | 1,400 | 2,000 | 1,000 |
| Holding power to rough surface paper (time until bonded portion peels off) [min] | 330 | 300 | 370 | 300 | 180 | 150 | 140 |

As seen from Table 1, by using a tetrablock copolymer where the Mw(A2)/Mw(A1) was 1.2 to 5, the Mw(A2) was 12,000 or more, Mw(B1)>Mw(B2), the Mw(Total) was 50,000 to 400,000, and the content of aromatic vinyl monomer units was 10 to 30% by weight, and polymer compositions comprising such a tetrablock copolymer, hot-melt adhesive compositions could be obtained which had high holding power not only to smooth surface paper but also to rough surface paper (Examples 1 to 4).

In contrast, the resulting hot-melt adhesive compositions had low holding power to rough surface paper if they comprised the tetrablock copolymers where the Mw(A1), the Mw(B1), the Mw(A2), and the Mw(B2) were out of the ranges specified in the present invention (Comparative Examples 1 and 2).

If the triblock copolymer was used instead of the tetrablock copolymer, the resulting hot-melt adhesive composition had low holding power to both of smooth surface paper and rough surface paper (Comparative Example 3).

The invention claimed is:

1. A tetrablock copolymer having an aromatic vinyl block (A1), a conjugated diene block (B1), an aromatic vinyl block (A2), and a conjugated diene block (B2) in this order,
    wherein Mw(A2)/Mw(A1) is 1.2 to 5, Mw(A2) is 13,000 or more, Mw(B1)>Mw(B2), and Mw(Total) is 50,000 to 400,000,
where the weight average molecular weight of the aromatic vinyl block (A1) is defined as Mw(A1), the weight average molecular weight of the conjugated diene block (B1) is defined as Mw(B1), the weight average molecular weight of the aromatic vinyl block (A2) is defined as Mw(A2), the weight average molecular weight of the conjugated diene block (B2) is defined as Mw(B2), and the weight average molecular weight of the tetrablock copolymer as a whole is defined as Mw(Total), and
    the content of aromatic vinyl monomer units is 10 to 30% by weight.

2. A polymer composition comprising 50% by weight or more of the tetrablock copolymer according to claim 1.

3. The polymer composition according to claim 2, comprising 50% by weight or less of a triblock copolymer having an aromatic vinyl block (A1), a conjugated diene block (B1), and an aromatic vinyl block (A2) in this order.

4. A hot-melt adhesive composition, comprising:
    the tetrablock copolymer according to claim 1; and
    a tackifying resin.

5. The hot-melt adhesive composition according to claim 4,
    wherein the content of the tackifying resin is 10 to 500 parts by weight relative to 100 parts by weight of the tetrablock copolymer.

6. The hot-melt adhesive composition according to claim 4, further comprising 1 to 500 parts by weight of a softening agent relative to 100 parts by weight of the tetrablock copolymer.

7. An adhesive tape comprising the hot-melt adhesive composition according to claim 4.

8. A packaging tape for an adherent containing recycled paper, the packaging tape comprising the hot-melt adhesive composition according to claim 4.

* * * * *